United States Patent
Ottavi

(10) Patent No.: US 10,595,671 B2
(45) Date of Patent: Mar. 24, 2020

(54) COFFEE MACHINE AND RELEVANT COFFEE EXTRACTION METHOD

(71) Applicant: SIMONELLI GROUP S.P.A., Belforte del Chienti (MC) (IT)

(72) Inventor: Nando Ottavi, Cessapalombo (IT)

(73) Assignee: SIMONELLI GROUP S.P.A., Belforte del Chienti (MC)

( * ) Notice: Subject to any disclaimer, the term of this patent is extended or adjusted under 35 U.S.C. 154(b) by 360 days.

(21) Appl. No.: 15/297,422

(22) Filed: Oct. 19, 2016

(65) Prior Publication Data

US 2017/0119202 A1 May 4, 2017

(30) Foreign Application Priority Data

Oct. 30, 2015 (IT) ........................ 102015000067186

(51) Int. Cl.
| | |
|---|---|
| A47J 31/06 | (2006.01) |
| A23F 5/26 | (2006.01) |
| A47J 31/46 | (2006.01) |
| A47J 31/42 | (2006.01) |
| A47J 31/36 | (2006.01) |

(52) U.S. Cl.
CPC ............. A47J 31/465 (2013.01); A23F 5/26 (2013.01); A47J 31/06 (2013.01); A47J 31/42 (2013.01)

(58) Field of Classification Search
CPC ......... A23F 5/26; A47J 31/06; A47J 31/0663; A47J 31/3671; A47J 31/40; A47J 31/42; A47J 31/465

USPC .......................................................... 99/286
See application file for complete search history.

(56) References Cited

U.S. PATENT DOCUMENTS

| | | | | |
|---|---|---|---|---|
| 2014/0123857 | A1* | 5/2014 | Rego ....................... | A47J 42/38 99/280 |
| 2016/0249761 | A1* | 9/2016 | Llopis .................... | A47J 31/38 99/282 |

FOREIGN PATENT DOCUMENTS

| | | | | |
|---|---|---|---|---|
| WO | WO-2010131242 | A1 * | 11/2010 | ......... A47J 31/0663 |
| WO | 2012138327 | A1 | 10/2012 | |
| WO | 2015051924 | A1 | 4/2015 | |
| WO | 2015055343 | A1 | 4/2015 | |

* cited by examiner

*Primary Examiner* — Phuong T Nguyen
(74) *Attorney, Agent, or Firm* — Egbert, McDaniel & Swartz, PLLC

(57) ABSTRACT

A coffee machine includes a weighing system to measure the weight of the liquid coffee extracted in a cup and a coffee grinding machine having a weight system to measure the weight of the ground coffee dispensed in a filter-holder. The coffee machine has a control unit provided with a memory, wherein infusion ratios for different types of coffees are saved and the coffee grinding machine includes a control unit operatively connected to the control unit of the coffee machine to send information about the weight of the ground coffee contained in the filter-holder. The control unit of the coffee machine uses the information received from the coffee grinding machine to extract a coffee that satisfies an infusion ratio selected by the operator.

6 Claims, 2 Drawing Sheets

COFFEE MACHINE AND RELEVANT COFFEE EXTRACTION METHOD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a coffee machine and to the relevant coffee extraction method.

2. Description of Related Art Including Information Disclosed Under 37 CFR 1.97 And 37 CFR 1.98.

WO2015/051924, in the name of the same applicant, discloses a coffee machine provided with a load cell that weighs the cup wherein the liquid coffee is dispensed and with a control logic that stops dispensing coffee when the desired weight is reached, in such manner to fill the cup with the desired quantity of coffee. However the coffee machine disclosed in WO2015/051924 does not receive any information on the weight of the dose of powder ground coffee used to make one cup of coffee. Therefore the quantity of water that is dispensed to make coffee is selected without considering the weight of the ground coffee contained in the filter.

As it is known, the quality of the liquid coffee served to customers strongly depends on the quantity of the powder grounded coffee dose that is inserted in the filter of the coffee machine.

WO2012/138327 discloses a coffee grinding machine comprising a load cell to weigh a ground coffee dose contained in a filter ready to be used in a coffee machine. However WO2012/138327 does not disclose any coffee machine connected to the coffee grinding machine to receive information on the weight of the ground coffee dose. Therefore, even if the ground coffee dose contained in the filter has an optimal weight, the quality of the coffee will depend on the quantity of water dispensed to extract coffee from said dose.

Consequently, in spite of using a coffee grinding machine as the one disclosed in WO2012/138327 and a coffee machine as the one disclosed in WO2015/051924, a technician of the field is not able to set an ideal infusion rate, meaning the rate between powder coffee and liquid coffee.

WO2015055343 discloses an espresso coffee dispensing machine, comprising a dispensing assembly and a balance to detect the quantity of ground coffee contained in a filter and the quantity of dispenses product.

The purpose of the present invention is to eliminate the drawbacks of the prior art, by disclosing a coffee machine and a coffee extraction method that provide high-quality liquid coffee with an optimal infusion rate between powder coffee and liquid coffee.

Another purpose of the present invention is to disclose a coffee machine that is precise, reliable, versatile, practical and automated.

BRIEF SUMMARY OF THE INVENTION

These purposes are achieved according to the present invention with the characteristics of the independent claim 1.

Advantageous embodiments of the invention will appear from the dependent claims.

A coffee machine comprises a weighing system to measure the weight of the liquid coffee extracted in a cup and a coffee grinding machine comprising a weighing system to measure the weight of the ground coffee dispensed in a filter-holder. The coffee machine comprises a control unit provided with a memory, wherein infusion ratios for different types of coffees are saved and the coffee grinding machine comprises a control unit operatively connected to the control unit of the coffee machine to transmit information about the weight of the ground coffee contained in the filter-holder. The control unit of the coffee machine uses the information received from the coffee grinding machine to extract a coffee that satisfies an infusion ratio selected by the operator.

The advantages of the coffee machine and of the coffee extraction method according to the present invention are evident. The use of such a machine provides high-quality coffee with a preset extraction ratio as suggested by the coffee producer according to the special coffee blend.

BRIEF DESCRIPTION OF THE SEVERAL VIEWS OF THE DRAWINGS

Additional features of the invention will appear clearer from the detailed description below, which refers to a merely illustrative, not limiting embodiment, wherein.

DETAILED DESCRIPTION OF THE INVENTION

Figure 1:
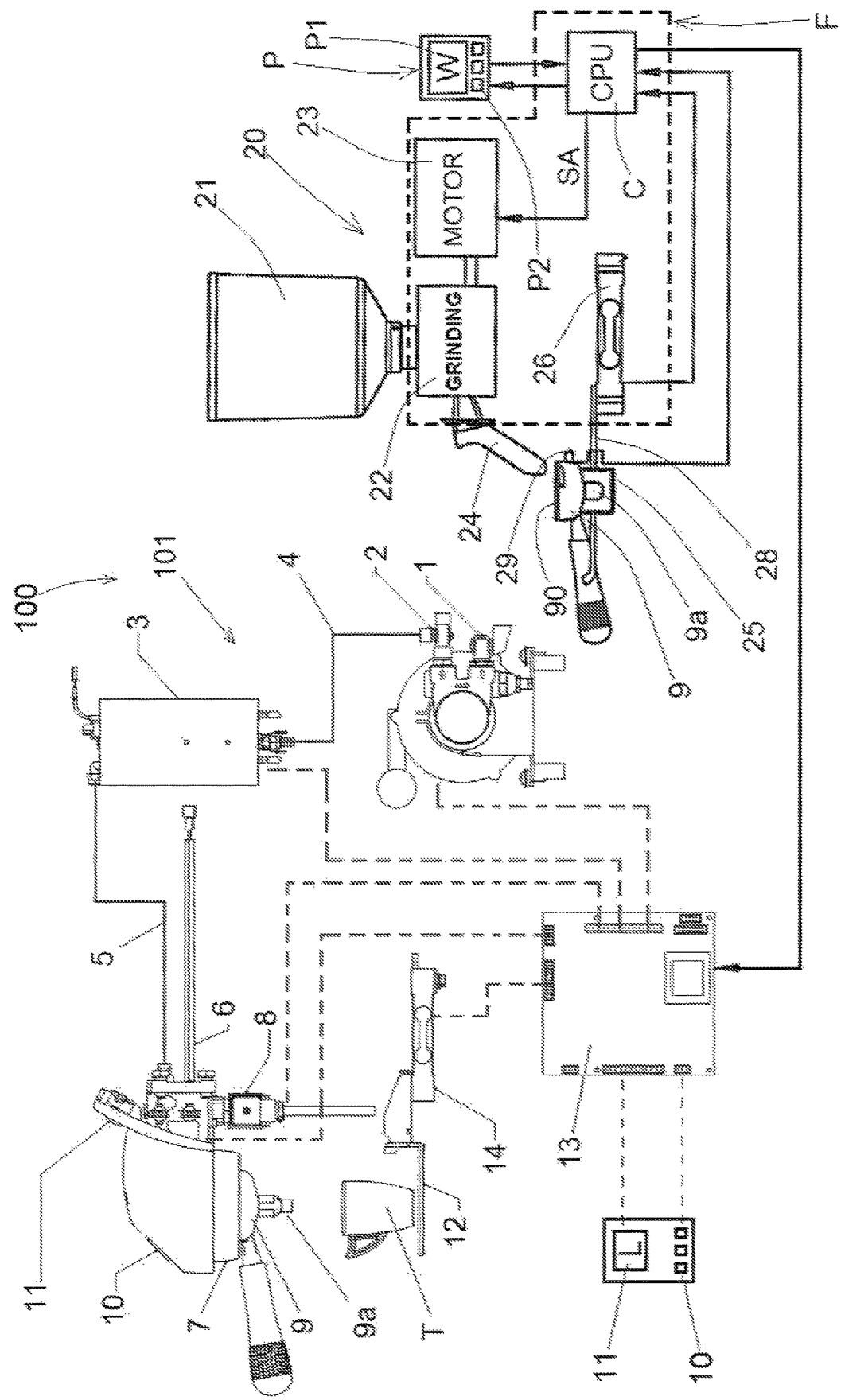
FIG. 1 is a block diagram that diagrammatically shows the coffee machine of the invention.

With reference to the figures, the coffee machine of the invention is disclosed, which is generally indicated with reference numeral (100).

The coffee machine (100) comprises a dispensing unit (7) to dispense the hot water used for infusion and a feeding and heating system (101) to feed hot water to the dispensing unit.

The feeding and heating system comprises:
an inlet (1) for water from the water system,
a pump (2) intended to convey the water towards a boiler (3) by means of a first water duct (4),
a second water duct (5) with a heating resistance (6) in such manner to convey hot water from the boiler (3) towards the dispensing unit (7) to dispense hot water,
an electrovalve (8) installed at one end of the second water duct (5) and at the inlet of the dispensing unit (7) to enable/disable the passage of hot water in the dispensing unit (7).

The coffee machine (100) also comprises:
- at least one filter-holder (9) provided with at least one dispensing nozzle (9a) to dispense liquid coffee,
- a keyboard (10) and a display (11), and
- a support surface (12) arranged under the dispensing unit and intended to support cups (T) to be filled.

The coffee machine (100) also comprises a control unit (13) connected to the pump (2), the boiler (3), the electrovalve (8), the keyboard (10) and the display (11).

In view of the above, according to the controls given by the operator on the keyboard (10), the control unit (13) enables the starting and the stopping of the pump (2), the heating level of the boiler (3), and the opening and the closing of the electrovalve (8).

The support surface (12) is arranged according to a horizontal plane and is preferably shaped as a grill, in order to let the coffee that leaks from the cup drip. The support surface (12) comprises a fixed frame (12b) and at least one mobile portion (12) that moves vertically with respect to the fixed frame (12b) in accordance to a weight disposed on the mobile portion. The mobile portion (12a) is disposed under the dispensing nozzle (7) in correspondence of the nozzles (9a) of the filter-holder when the filter-holder is mounted in the dispensing unit.

Figure 2:
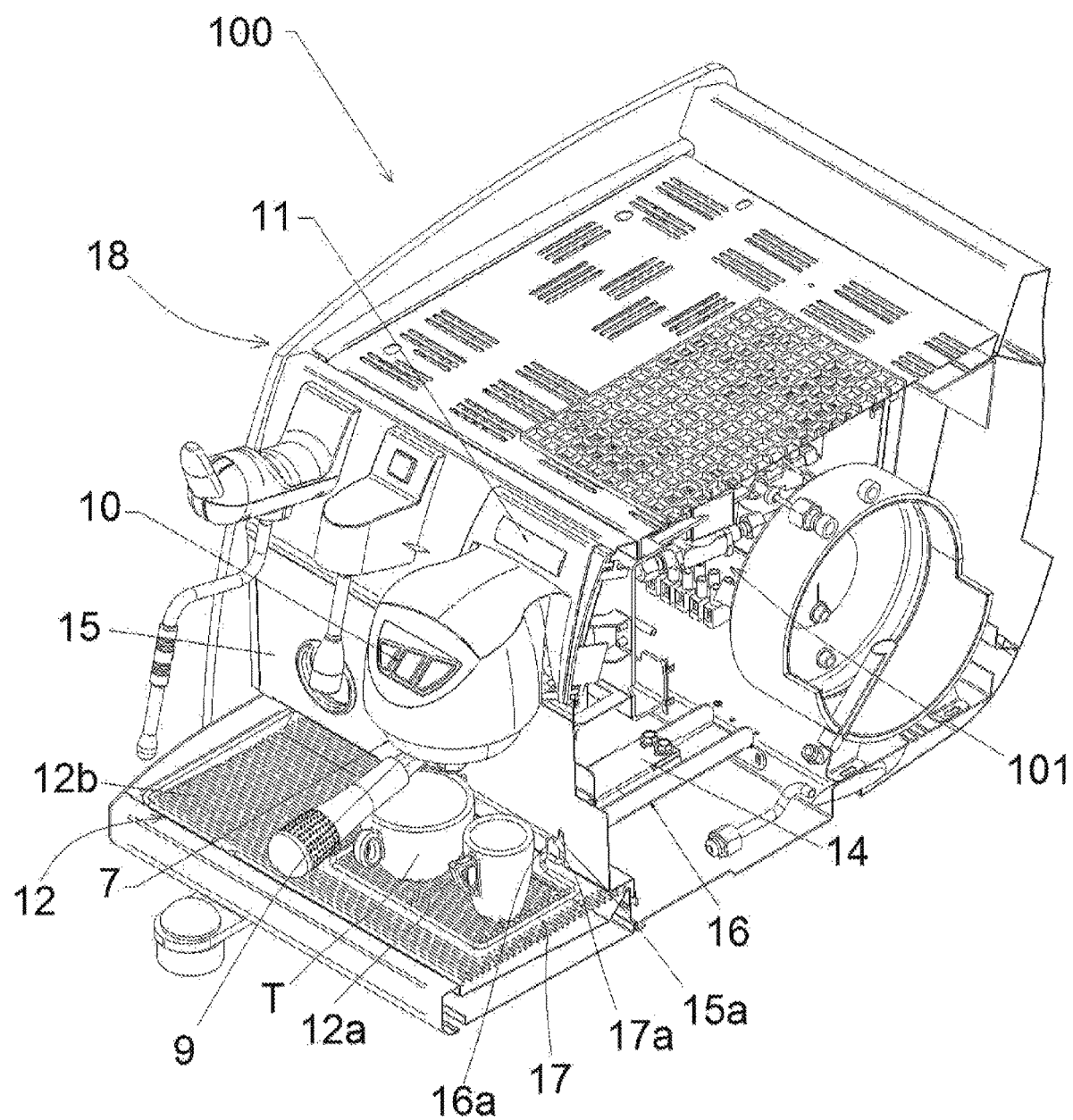
FIG. 2 is a perspective view of the coffee machine of FIG. 1, wherein the coffee grinding machine has been omitted.

Although FIG. 2 only shows one dispensing unit (3) and one filter-holder (9), the machine (100) may be provided with a dispensing unit intended to support multiple filter-holders aligned on the support surface (12) or multiple dispensing units aligned on the support surface, wherein each dispensing unit is intended to support one filter-holder.

Therefore, if the coffee machine (100) is provided with multiple filter-holders aligned on the support surface (12), the support surface (12) will comprise a plurality of mobile portions (12a) in correspondence of each dispensing nozzle (9a) of each filter-holder or in correspondence of two dispensing nozzles in case of filter-holder with two dispensing nozzles.

Each mobile portion (12a) of the support surface is associated with an electronic load cell (14) intended to detect the weight of each cup (T) placed on the corresponding mobile portion (12a). The load cell (14) is connected to the control unit (13). In view of the above, the load cell (14) instantaneously detects the weight of the cup that corresponds to the quantity of liquid coffee filling the cup and provides such a piece of information to the control unit (13).

The control unit (13) is provided with a memory wherein the infusion ratios that necessary to obtain different types of coffee in the cup are saved. The infusion ratio is the ratio between ground coffee and liquid coffee. For example, three infusion ratios can be saved, respectively for three types of coffee: medium coffee, strong coffee and weak coffee.

The keyboard (10) is used by the operator to select the specific type of coffee (medium, strong or weak) requested by the customer. Then, according to the type of coffee selected by the operator, the control unit (13) checks the specific quantity of hot water to be dispensed in each filter-holder (9), as illustrated in detail below.

When a cup (T) is placed on a mobile portion (12a) of the support surface, the load cell (14) sends information about the weight of the specific cup (T) to the control unit (13) that acquires such information as cup tare.

Now, the operator can give the coffee dispensing command to the coffee machine (100), activating the pump (2) intended to convey the pressurized hot water along the water ducts intended to feed the filter-holders (9) and, at the same, opening the electrovalve (8) arranged at the inlet of the dispensing unit (7). In view of the above, the cup (T) starts being filled with the coffee dispensed by the filter-holder (9), and the weight of the cup on the load cell (14) increases.

Considering that the load cell (14) is interfaced with the control unit (13), the control unit (13) receives the information on the progressive increase of the weight of the cup in real time while it is filled. The display (11) shows the weight (L) of the liquid coffee contained in the cup (T).

With reference to FIG. 2, the coffee machine (100) comprises a body (18) provided with a front wall (15) wherefrom the dispensing unit (7) projects.

Preferably, the load cells (14) associated with the mobile portions (12a) are housed in the body (18) of the coffee machine and in any case behind the vertical front wall (15) wherefrom both the dispensing unit (7) and the support surface (12) project frontally. In view of the above, the load cells are protected against coffee spraying.

Every load cell (14) must be connected to a corresponding mobile portion (12a) of the support surface (12). For this reason, each mobile portion (12a) is fixed to one or more shelves (16) connected with the corresponding load cell (14). In this way the load cell (14) can check the weight variations on the corresponding mobile portion (12a) when the cup is progressively filled with coffee.

Each shelf (16) is inserted through a corresponding through slot (15a) in the vertical front wall (15) of the coffee machine (100). In this way, each shelf (16) has a fixing part (16a) that protrudes frontally from the vertical front wall (15).

Each mobile portion (12a) has a frame (17) provided with a fixing portion (17a) that is fixed to the fixing portion (16a) of the shelf. In this way the mobile portions (12a) can be easily dismounted to clean the machine.

The coffee machine (100) also comprises a coffee grinding machine (20).

The coffee grinding machine (20) comprises a container or hopper (21) to feed coffee beans to the grinding assembly (22) intended to grind the coffee beans. An electric motor (23) is connected to the grinding assembly (22) in such manner to actuate or stop the grinding assembly (22). A feeding conduit (24) is connected to the grinding assembly (22) to feed ground coffee in a filter (90) supported by a filter-holder (9) with one or more dispensing nozzles (9a). Filter-holders with only one dispensing nozzle or with two dispensing nozzles are generally provided.

When the electric motor (23) is actuated, the coffee beans are ground by the grinding assembly (22) and the ground coffee is supplied by the feeding conduit (24). When the electric motor (23) is stopped, the feeding of ground coffee from the feeding conduit (24) is interrupted.

The coffee grinding machine (20) comprises a frame (F) (shown with a broken line in FIG. 1) that supports and contains the grinding assembly (22) and the electrical motor (23).

A support platform (25) is disposed under the feeding conduit (24). The support platform (25) is vertically movable according to the weight disposed on the support platform (25). The support platform is intended to support the filter-holder (9) in such manner that the ground coffee is dispensed in the filter (90).

The support platform (25) is associated with a load cell (26). The load cell (26) is intended to weigh the quantity of ground coffee dispensed from the dispensing duct (24) and contained in the filter (90) of the filter-holder (9);

The load cell (26) is preferably disposed inside the frame (F) in order not to get dirty and avoid weighing errors caused by the presence of dirt or coffee powder falling on the load cell. In such a case, the support platform (25) is disposed outside the frame (F) and is connected to the load cell (26) by means of a connection bracket (28). In this way, the weight of the ground coffee contained in the filter (90) of the filter-holder resting on the support surface (25) is transmitted to the load cell (26) through the connection bracket (28).

The coffee grinding machine (20) comprises a control unit (C) electrically connected to the load cell (26) to receive an indicative value of the weight of the ground coffee contained in the filter (90). The control unit (C) is disposed inside the frame (F).

The control unit (C) comprises a memory wherein a preset weight value of ground coffee corresponding to one dose or two doses or more doses can be saved.

The load cell (26) can be set according to the weight of the filter-holder (9) in such manner to exactly detect the weight of the ground coffee contained in the filter (90). Alternately, the load cell (9) is not set and directly detects the weight of the filter-holder (9) plus the weight of the ground coffee contained in the filter (90) of the filter-holder. In such a case, the weight of the filter-holder (9) to be deducted from the weight detected by the load cell (26) is saved in the memory (M) of the control unit (C) in such a way to obtain the weight of the ground coffee contained in the filter (90).

Moreover, the control unit (C) comprises comparison means that compare the weight of the coffee detected by the load cell (26), which corresponds to the coffee contained in the filter (90), with the preset value saved in the memory and send a stop signal (SA) to the electrical motor (23) when the weight of the ground coffee contained in the filter (6) reaches the preset value saved in the memory. The stop signal (SA) stops the electrical motor (23) and consequently the grinding assembly (22) and the dispensing of the ground coffee from the feeding conduit (24).

The coffee grinding machine (1) optionally comprises a presence sensor (29) disposed near the support surface (25) to detect a correct position of the filter-holder (9) on the support surface (25). The presence sensor (29) is electrically connected to the control unit (C). Such a presence sensor (29) is advantageously a proximity switch that sends an ON-OFF signal to the control unit (C).

As an alternative or in addition to the presence sensor, the coffee grinding machine (1) comprises a manually actuated button connected to a switch to start the grinding assembly (22).

The coffee grinding machine (20) also comprises a control panel (P) electrically connected to the control unit (C). The control panel (P) comprises a display (P1) and a button panel (P2). The display (P1) is used to display the weight (W) of the ground coffee detected by the load cell (26). The button panel (P2) is used to change the preset weight value of the ground coffee saved in the memory of the control unit (C).

According to the invention, the control unit (C) of the coffee grinding machine (20) is operatively connected to the control unit (13) of the coffee machine (100). In this way the control unit (13) of the coffee machine (100) can receive from the control unit (C) of the coffee grinding machine (20) information on the weight of the ground coffee contained in the filter-holder (9) that was filled in the coffee grinding machine (20).

Given the fact that the control unit (C) of the coffee grinding machine (20) is near the control unit (13) of the coffee machine (100), the two control units (C) and (13) can be connected by cable with the data line.

However, to avoid cable connections that can be cumbersome, the control units (C) and (13) are advantageously connected in wireless mode, for example with short-range radio frequency protocols (Bluetooth) or wireless local network (WI-FI) or mobile telephone systems (GSM, 3G, 4G). In order to receive data from the control unit (C) of the coffee grinding machine (20), the control unit (13) of the coffee machine (100) uses a data queuing system of FIFO (first in-first out) type in order not to create interference when multiple filter-holders (9) are used.

This description continues illustrating the operation of the coffee machine (100).

Considering that the weight of the single filter-holder (for one cup of coffee) is different from the double filter-holder (for two cups of coffee), in order to recognize the two types of filter-holder, initially the coffee grinding machine (20) needs to make a self-learning step, wherein the weights of the various types of filter-holder (9) are saved, by simply placing the filter-holders (9) on the support platform (25) one by one.

At the beginning it is necessary to set the weight of the individual dose (for single-dose filter-holder) and the weight of the double dose (for two-dose filter-holder) of ground coffee to be saved in the memory of the control unit (C) of the grinding coffee machine.

Then the coffee extraction process can be started.

The filter-holder (9) to be used is placed on the support surface (25) and the load cell (26) continuously weights the tare of the filter-holder (9) to have a weight value 0 also in case of dirt in the filter-holder.

When the filter-holder is placed on the support surface (25), the control unit (C) receives the weight of the filter-holder (9) and compares it with the weights of the filter-holders saved in the memory, in such manner to recognize whether it is a single-dose filter-holder or a two-dose filter-holder.

To start grinding the coffee beans, the operator can select two modes: automatic mode, wherein grinding starts after a preset delay time, and manual mode, wherein grinding starts when the operator pushes a dispensing button from the keyboard (P2).

In both modes, the control unit (C) compares the weight of the ground coffee measured by the load cell (26) during dispensing and the weight of the coffee saved in the memory and stops the motor (23), interrupting grinding when the weight of the coffee dispensed in the filter-holder reaches the weight saved in the memory.

Advantageously, in the control unit (C) a software is installed, which implements an algorithm used to filter the impulses coming from external vibrations. The software and hardware system filters the impulses coming to the load cell (26) that are due to the coffee weight force. In fact, if the users accidentally hits the coffee grinding machine, the load cell (26) will receive a blow (or a counterblow) that will cause a signal in the load cell. In effect, this is a false signal, which is not caused by the weight of the extracted coffee.

By means of an algorithm, the software installed in the logic unit (C) can recognize:
1) strong impulses coming and disappearing as spike waves (for example a violent pressure on the load cell); and
2) weak continuous impulses (for example a vibration of the worktop caused by another household appliance, such as a dishwasher).

For this reason the coffee grinding machine is calibrated detecting and saving a white signal coming from the load cell (26) that detects all the signals that are not caused by falling coffee. During the operation of the coffee grinding machine, the signal coming from the load cell (26) and the white signal, which is appropriately inserted, are detected and compared continuously. The white signal is deducted from the gross signal coming from the load cell, obtaining the only signal that is due to extracted coffee.

Considering that, after stopping the motor (23), a small quantity of grounded coffee keeps falling from the dispensing unit (24), the algorithm stops grinding in advance, that is to say before the weight of the dispensed coffee reaches the weight saved in the memory, considering the coffee that falls after stopping the motor (23). Such a regulation can be set according to the type of coffee and the machine.

When the dosing of grounded coffee in the filter-holder (9) is finished, the display (P1) of the coffee grinding machine shows the weight (W) of the coffee contained in the filter-holder. Such a weight (W) is the actual weight of the coffee contained in the filter-holder and is not the preset weight of the dose that is saved in the memory.

Now the control unit (C) of the coffee machine (20) sends the control unit (C) of the coffee grinding machine (100) information on the weight (W) of the ground coffee contained in the filter-holder (9) that was filled in the coffee grinding machine (20).

When the control unit (13) of the coffee machine (100) is informed about the weight of the coffee (W) in the filter-holder (9), the control unit (13) of the coffee machine (100) will stop the extraction of liquid coffee, when the weight (L) of the liquid coffee in the cup (T) meets the infusion ratio that is preset for the various types of coffee.

The infusion rate is the real rate between the weight (W) of the dose of ground coffee inserted in the filter-holder (9) and the weight (L) of the liquid coffee in the cup at the end of the extraction.

The infusion rate changes according to the coffee blend used in accordance to the instructions given by the coffee producer. The ideal infusion rate is comprised between 0.4 and 0.6 for a perfect espresso coffee.

For illustrative purposes, for a specific coffee blend:
a weak coffee has an infusion rate of 0.3-0.4
a medium coffee has an infusion rate of 0.4-0.6
a strong coffee has an infusion rate of 0.6-0.7

The preset infusion rates are saved in the memory of the control unit (13) of the coffee machine. When the control unit (13) of the coffee machine has received the weight (P) of the ground coffee from the control unit (C) of the coffee grinding machine, by knowing the desired infusion rate, the control unit (13) of the coffee machine can calculate the weight (L) of the liquid in cup to be reached in order to obtain the desired infusion rate.

The load cell (14) of the coffee machine measures the weight of the liquid in the cup (T) and the control unit (13) of the coffee machine stops the dispensing of liquid coffee when the weight (L) of the liquid in the cup (T) meets the desired infusion ratio.

Numerous variations and modifications can be made to the present embodiment of the invention, which are within the reach of an expert of the field, falling in any case within the scope of the invention as disclosed by the attached claims.

I claim:

1. A coffee machine comprising:
a dispensing unit adapted to dispense hot water;
a feeding and heating system adapted to feed hot water to said dispensing unit;
at least one filter-holder comprising a filter adapted to receive one or more doses of ground coffee and at least one dispensing nozzle, said filter-holder inserted in the dispensing unit and adapted to extract liquid coffee;
a support surface comprising a fixed frame and at least one mobile portion that moves vertically with respect to the fixed frame in accordance to a weight on the mobile portion, the mobile portion being disposed under the dispensing nozzle of the filter-holder to support a cup, the cup adapted to be filled with liquid coffee;
at least one load cell cooperative with the mobile portion of said support surface, the load cell adapted to detect a weight of the cup on the mobile portion;
a control unit connected to the load cell to receive the weight of the cup, said control unit having a memory;
a keyboard and a display connected to the control unit;
a coffee grinder comprising:
  a grinding assembly adapted to grind coffee beans;
  a container cooperative with said grinding assembly so as to feed the coffee beans to said grinding assembly;
  an electric motor connected to said grinding assembly, said electric motor actuating or stopping said grinding assembly;
  a dispensing duct connected to the grinder unit to dispense ground coffee in the filter of the filter-holder;
  a support platform disposed under said dispensing duct and supporting the filter-holder so that the ground coffee is dispensed in the filter, said support platform being vertically movable relative to the weight on said support platform;
  another load cell connected to said support platform, said another load cell weighing a quantity of ground coffee dispensed from said dispensing duct and contained in the filter of the filter-holder;
  another control unit electrically connected to said another load cell to receive an indicative value of the weight of the ground coffee contained in the filter, wherein said another control unit of said coffee grinder is operatively connected to the control unit to send information as to the weight of the ground coffee contained in the filter-holder, wherein at least one preset infusion ratio is stored in the memory of said control unit, said infusion ratio being selected by an operator, said control unit being configured to stop dispensing coffee when a weight of liquid coffee in the cup measured by the load cell satisfies the preset infusion ratio selected by the operator.

2. The coffee machine of claim 1, wherein said another control unit is operatively connected to said control unit by a wireless connection.

3. The coffee machine of claim 1, wherein said another control unit is operatively connected to said control unit by a wired connection having a data transmission line.

4. The coffee machine of claim 1, wherein said control unit uses a FIFO (first in-first out) data queuing system in order to receive data from said another control unit.

5. The coffee machine of claim 1, wherein said another control unit comprises a memory that saves a weight of at least one preset coffee dose selected by the operator, and wherein said control unit is configured to stop said motor and to stop grinding when the weight of the ground coffee contained in the filter-holder and measured by said another load cell reaches the weight of the preset dose selected by the operator.

6. The coffee machine of claim 5, wherein the memory of said another control unit stores a weight or type of the filer-holder as a tare weight.

* * * * *